ized Patent [19]

Banos

[11] Patent Number: 4,631,931
[45] Date of Patent: Dec. 30, 1986

United States Patent

[54] MACHINE FOR CONTINUOUSLY FABRICATING BY TRIDIMENSIONAL KNITTING SECTION ELEMENTS OF COMPOSITE MATERIAL

[75] Inventor: Jean Banos, Merignac, France

[73] Assignee: Aerospatiale Societe Nationale Industrielle, France

[21] Appl. No.: 732,443

[22] Filed: May 9, 1985

[30] Foreign Application Priority Data

May 15, 1984 [FR] France .............................. 84 07490

[51] Int. Cl.<sup>4</sup> ....................... D04B 11/04; D04B 35/36
[52] U.S. Cl. .......................................... 66/83; 66/88; 66/147
[58] Field of Search ................... 28/140, 149; 66/1 R, 66/83, 88, 147, 190; 139/11, 22, 383 B

[56] References Cited

U.S. PATENT DOCUMENTS

| | | | |
|---|---|---|---|
| 2,601,770 | 7/1952 | Goldsmith | 66/147 R |
| 3,834,424 | 9/1974 | Fukuta et al. | 139/22 |
| 3,955,602 | 5/1976 | King | 139/11 |
| 4,183,232 | 1/1980 | Banos et al. | 66/11 |
| 4,526,026 | 7/1985 | Krauland, Jr. | 66/1 R |

*Primary Examiner*—Wm. Carter Reynolds

*Attorney, Agent, or Firm*—McGlew and Tuttle

[57] ABSTRACT

The machine is of the type comprising rods defining the volume of the section element and extending in the longitudinal direction of the latter and a knitting head depositing threads around the rods in a direction perpendicular to the latter. The rods are thin hollow rods (12). A die (9) maintains the hollow rods in a fixed position parallel to each other in a configuration which corresponds to the cross-sectional shape of the desired section element. Feed devices (7, 8) feed the longitudinal threads of the section element through the hollow rods (12). A device (15) is provided for retaining one end (12a) of the threads issuing from the rods in an identical configuration. Two knitting heads (16, 17) of known type deposit threads in two planes which are orthogonal and perpendicular to the rods (12) in the vicinity of the ends of the latter. Devices (15, 5) are provided for continuously displacing the threads issuing from the rods as the threads are deposited by the knitting heads. A device (5) is provided for conveying the knitted section element to a resin-impregnating station (21) and to a device (22) for hardening the resin and to a severing device for severing the section element at the desired length.

8 Claims, 3 Drawing Figures

MACHINE FOR CONTINUOUSLY FABRICATING BY TRIDIMENSIONAL KNITTING SECTION ELEMENTS OF COMPOSITE MATERIAL

FIELD OF THE INVENTION

The present invention relates to the fabrication of section elements of composite material knitted in three dimensions from natural or synthetic threads or fibers which may be impregnated with a resin and hardened.

BACKGROUND

There has been disclosed in the patent application Ser. No. 732,430 of the applicant filed on the same day as the present application a section element of the aforementioned type which has a shape in cross section including reentrant angles and/or concave parts and which is continuously knitted with no limitations of the length, and a method for fabricating said section elements.

SUMMARY OF THE INVENTION

An object of the invention is to provide for this purpose an automatic machine for continuously fabricating by a tridimensional knitting section elements of a composite material which may or may not be impregnated with a resin, with no limitation of the length, of the type comprising rods defining the outer shape of the desired section element and entending in the longitudinal direction of the latter, and at least two knitting heads depositing threads around said rods in two planes which are orthogonal to each other and perpendicular to said rods, wherein said rods are thin hollow rods and the machine comprises means for maintaining said hollow rods in a fixed manner parallel to one another in a configuration which corresponds to the cross-sectional shape of the desired section element, means for feeding continuous longitudinal threads of the section element which are held taut through said hollow rods, stop means for retaining one end of said threads issuing from the rods in the same configuration, and a group of knitting heads of known type so disposed as to deposit layers of continuous threads in two directions transverse to the direction of said rods in the vicinity of the ends of the latter, means for guiding the threads issuing from said rods in a continuous manner as said layers of threads are deposited by said knitting heads, means for packing and advancing the knitted section element obtained, a station for impregnating the section element with a resin, means for hardening said resin, and means for severing the section element disposed in the path of the latter.

According to another feature of the invention, said means maintaining said hollow rods in a fixed position in the desired configuration which corresponds to the cross-sectional shape of the section element comprise a detachable die provided with a plurality of rows of orifices.

According to another feature of the invention, said means on which the ends of the threads issuing from said hollow rods are fixed comprise a block provided with a plurality of orifices in a configuration corresponding to that of the orifices provided in said die.

BRIEF DESCRIPTION OF THE DRAWING

The following description, with reference to the accompanying drawing, given by way of a non-limiting example, will explain how the present invention can be carried out.

In the drawing.

DETAILED DESCRIPTION

Figure 1:
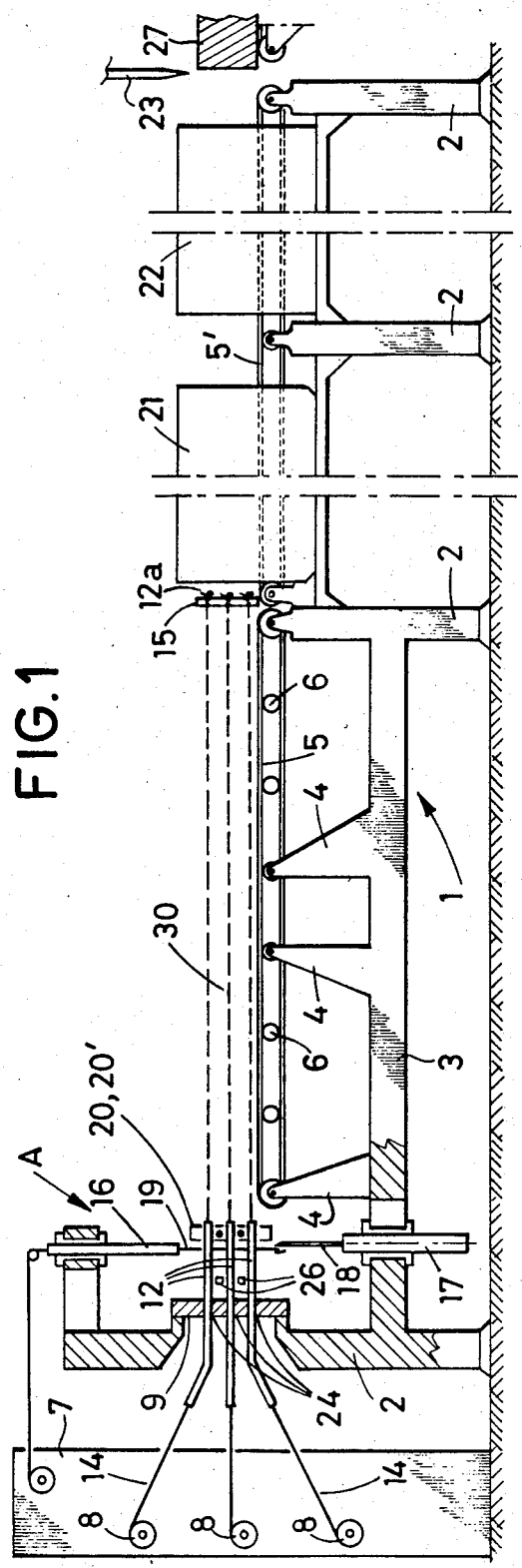
FIG. 1 is a side elevation or view of a machine according to the invention.

With reference to FIG. 1, the machine comprises a frame generally designated by the reference numeral 1 and having vertical uprights 2, longitudinal side members 3 and supports 4 carrying guide means such as a continuous conveyor 5, for example having a belt, of known type whose upper side is supported by rollers 6 (only a part of which is shown in the drawing) and means (not shown) for driving this conveyor.

At one of its ends, the machine according to the invention includes a feed bench 7 on which thread-feeding reels 8 are rotatively mounted.

Between the feed bench 7 and one of the ends of the conveyor, a first vertical upright 2 carries a die formed by a plate 9 detachably mounted on the upright 2 and provided with a plurality of orifices 24 disposed for example in parallel rows.

Thin hollow rods 12 are suitably fixed by known means (or mounted by a drive fit) in the orifices 24 of the die in such manner that the end portions thereof remote from the feed bench 7 extend in parallel directions in a configuration similar to the cross-sectional shape of the desired section element 30 and define therebetween crossing passageways 10 and 11.

The end portions of the rods 12 extend outside the die 9 on the side remote from the bench 7 for a short distance of a few centimeters.

Threads 14 held taut under the effect of a braking of the reels 8 extend through the hollow rods 12 and through the corresponding orifices of a head block 15 which has parallel rows of orifices 13 corresponding in number to the orifices 24 of the die 9 and having an identical configuration. The ends of the threads 14 are fixed in position on the opposite side of the head block 15, for example by knots 12a or some other suitable means.

Diagrammatically represented in FIG. 1 is a part A of a group of knitting heads A, B of known type (for example such as that disclosed in the French Patent No. 73/14956 and U.S. Pat. No. 4,183,232 of the applicant) comprising a vertical first head including a thread-presenting device 16 and a support 17 carrying a series of needles 18 disposed in a direction perpendicular to the parallel parts of the rods 12 in the vicinity of the ends of the latter adjacent to the head block 15.

The group of knitting heads shown partly at A in FIG. 1 also includes a second head B (FIG. 2) having a thread-presenting device 20' and a series of needles 20 adapted to effect a reciprocating movement in a direction perpendicular to the rods 12 and to the threads deposited by the first head and to take hold of the threads presented by the presenting device, in the known manner.

These knitting heads are known and are not part of the invention and reference may be made to this subject in the aforementioned patents of the applicant.

However, the series of needles 20 may be advantageously replaced for certain shapes of the section elements, by a thread "feeding" device, for example formed by a tube which is subjected to a reciprocating movement and through which passes the thread coming from a reel, the tube travelling in the passageways 10 of the die 9 and crossing the passageways 11.

In order to take hold of the threads 19 and render them taut in the passageways 11, the needles 18 are subjected to a reciprocating movement and the presenting device 16 and the support 17 of the series of needles 18 are adapted to be movable in two orthogonal directions in a plane parallel to the plane of the die 9.

The second knitting head B, identical to the knitting head 16, 17, is so disposed as to deposit threads in the rows 10 perpendicular to the threads 19 disposed in the passageways 11.

Figure 2:
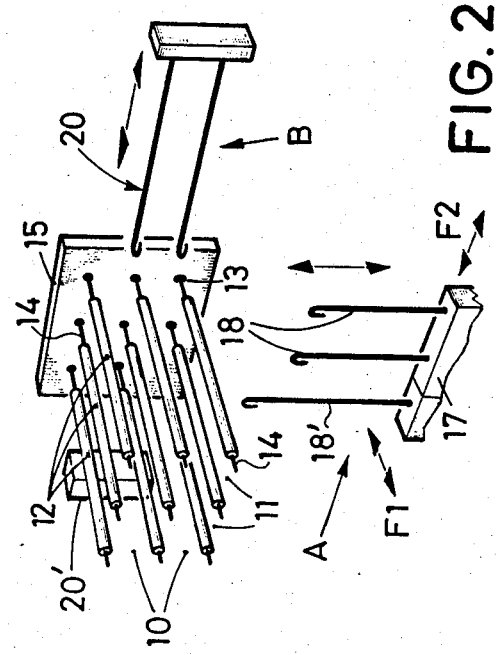
FIG. 2 is a perspective view of a part of the machine showing the knitting heads of the latter.

With reference to FIG. 2, it can be seen that the series of needles 17 can be displaced by known mechanical means in a reciprocating manner in three orthogonal directions shown by the arrows.

The second series of needles of the second knitting head, designated by the reference numeral 20, is identical to the series of needles 17 and operates in the same way but can only effect a movement of translation for the purpose of taking the threads from a dispensing or presenting means (not shown) located on the opposite side of the rods 12, and then bringing them into the passageways 10.

As the threads are deposited in layers by the knitting heads 17 and 20, the head 17 is displaced in the direction indicated by the arrow F1 (FIG. 2) so as to exert a packing action on the already deposited threads and then returns to its initial position for clearing the passage for the series of needles 20 depositing threads in the passageways 10. The interlocking of the threads due to the sequential motion of the needles 18 and heads with needles 20 are shown in FIG. 3.

Figure 3:
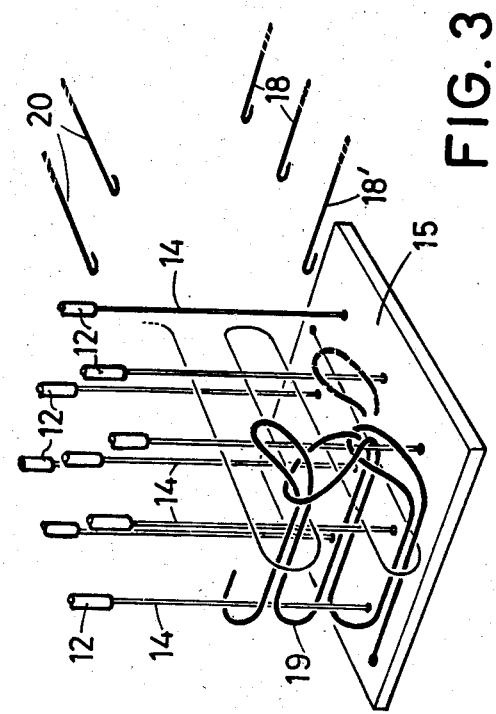
FIG. 3 is a perspective view showing a part of the element to be knit with parts of the machine therearound.

Upon each reciprocating movement, the series of needles 17 is shifted one step in the direction of arrow F2 so as to deposit threads in alternating passageways (again see FIG. 3).

It will be understood that the longitudinal threads 14 of the section element 30 are pulled by the head block 15 on the conveyor 5 at a speed which corresponds to the speed of the superimposition of different layers of threads by the knitting heads, for example step-by-step as the series of needles 17 are shifted in the direction of arrow F1 for packing the knitting threads of the second element.

It will also be understood that packing means independent from the head 17 could alone effect the packing. This packing means could be formed by a comb 26 whose teeth would be introduced into the passageway 10 for example. As the comb would be located between the die 9 and the plane containing the needles 18, it would then undergo a reciprocating movement in the direction of arrow F1.

Moreover, the support 17 may have one or more needles 18' which have a length and/or a travel different from those of the needles 18 (FIGS. 2 and 3) so as to result in varying dimensions of different finished parts forming the section of a section element.

It will also be understood that the section element e.g. element 30 in FIG. 1, may thus be knitted in a continuous manner in three dimensions, its length only being limited by the length of the threads stored on the reels 8, it being possible also to tie these threads to other threads contained on full reels intended to be substituted for the reels 8 when the latter are empty.

The section element carried by the conveyor 5 and formed at the rear of the headblock 15, and after removal of the latter, is fed through an impregnating station 21 diagrammatically shown in FIG. 1 in which the section element knitted in three dimensions is completely impregnated with a hardenable resin. As it issues from the impregnating station 21, the second element is conveyed by another conveyor 5' through an appropriate oven or stove 22 so as to harden the resin impregnating the section element.

The section element leaving the hardening station 22 may be cut into sections 27 of suitable length, for example by means of a severing device diagrammatically represented and designated by the reference numeral 23. This device may be formed by a rotary cutting blade, a circular saw or any other suitable means. Preferably, these severing means 23 are located outside the end supporting roller of the conveyor 5'.

It will furthermore be understood that more than one severing device, such as 23, may be provided, one being provided before the impregnating station 21 so as to cut through a section element which has been merely knitted. In this case, the machine may be provided with known means (not shown) for immobilizing the threads and preventing the section element from fraying or becoming unknitted.

I claim:

1. An automatic machine for continuously fabricating by a tridimensional knitting, section elements of a composite material which are to be impregnated with a hardenable resin, comprising rods defining the outer shape of the desired section element and extending in a longitudinal direction of the section element, and a group of at least two knitting heads for depositing threads around said rods in two planes which are orthogonal to each other and perpendicular to said rods, said rods being thin hollow rods, and the machine further comprising a die formed by a plate for maintaining said hollow rods in a fixed manner parallel to one another in a configuration corresponding to the cross-sectional shape of the desired section element, means for feeding continuous longitudinal threads of the section element taut through said hollow rods, means for holding said threads taut, stop means for retaining in the same configuration one end of said threads issuing from the rods, said group of knitting heads being arranged in such manner as to deposit layers of continuous threads in two directions transverse to the direction of said rods in the vicinity of the ends of said rods, means for guiding the threads issuing from said rods in a continuous manner as said layers of threads are deposited by said knitting heads, means for packing and advancing the knitted section element thus obtained, a station for impregnating the section element with a resin, means for hardening said resin impregnating the section element, and severing means disposed in a path of the section element at any point of the section element for cutting the element.

2. A machine according to claim 1, wherein said die is detachable and is provided with a plurality of parallel rows of orifices extending in two directions and being distributed in said configuration corresponding to the cross-sectional shape of the desired section element, said thin hollow rods being mounted for movement in said orifices.

3. A machine according to claim 2, wherein said stop means fixing the ends of the threads issuing from said hollow rods comprise a block provided with a plurality of parallel rows of orifices in a configuration identical to the configuration of the orifices provided in said die.

4. A machine according to claim 1, wherein said group of knitting heads comprises two heads disposed in two transverse directions and each formed by a thread-presenting device and a series of needles confronting the thread-presenting device.

5. A machine according to claim 4, wherein the thread-presenting device and the series of needles of one of said heads are adapted to be displaced, in addition to the movement of translation pertaining to the needles, on one hand, in a direction parallel to said hollow rods and, on the other hand, alternately in a direction perpendicular to said rods, for changing passageways on each side of each row of longitudinal threads passing through the rods.

6. A machine according to claim 1, including a frame, said knitting heads being mounted on said frame at one end of said frame, said station for impregnating the section element, said means for hardening said resin impregnating the section element and said severing means all being mounted at an opposite end of said frame, said means for guiding the threads comprising a conveyor mounted on said frame and extending from said one end of said frame to said opposite end of said frame.

7. A machine according to claim 4, wherein at least one of the series of needles is provided with at least one needle whose length is different from that of the other needles in said series.

8. A machine according to claim 1, wherein said means for packing and advancing the section element comprise a comb undergoing a reciprocating movement in the longitudinal direction of the section element, the teeth of said comb travelling in parallel passageways formed by the hollow rods.

* * * * *